Figure 1:
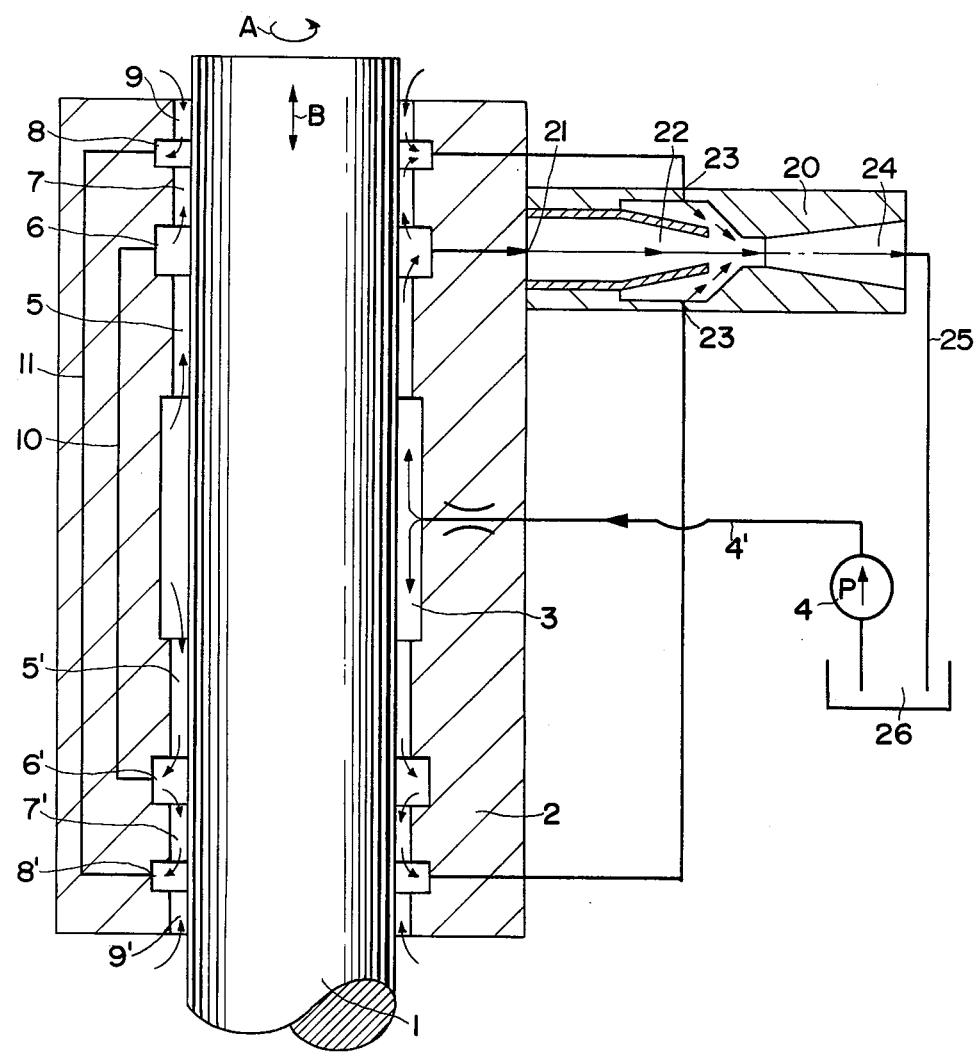

Patent [19] [11] 4,245,844
Pohl et al. [45] Jan. 20, 1981

[54] APPARATUS FOR REMOVING LEAKAGE FLOW OF A PRESSURIZED MEDIUM FROM GAP TYPE SEALS

[75] Inventors: Andreas Pohl, Pfungstadt; Gerhard Hintz, Ober-Ramstadt; Guenter Keller, Modautal, all of Fed. Rep. of Germany

[73] Assignee: Firma Carl Schenck AG, Darmstadt, Fed. Rep. of Germany

[21] Appl. No.: 126,969

[22] Filed: Mar. 3, 1980

[30] Foreign Application Priority Data

Mar. 14, 1979 [DE] Fed. Rep. of Germany ....... 2909878

[51] Int. Cl.³ ............................................ F16J 40/00
[52] U.S. Cl. .................................. 277/3; 277/DIG. 1
[58] Field of Search ........................ 277/DIG. 1, 1–32

[56] References Cited

U.S. PATENT DOCUMENTS

| 2,650,116 | 8/1953 | Cuny | 277/3 |
| 4,114,058 | 9/1976 | Albaric | 277/3 |
| 4,114,059 | 9/1978 | Albaric et al. | 277/3 |
| 4,193,603 | 3/1980 | Sood | 277/3 |

Primary Examiner—Robert I. Smith
Attorney, Agent, or Firm—W. G. Fasse; D. F. Gould

[57] ABSTRACT

The leakage flow of a pressurized medium in gap type seals is controlled by a suction device at the sealing location of the gap seal. The suction device comprises a jet pump. The jet pump is driven by the pressurized medium in the gap seal or by an externally supplied fluid medium.

11 Claims, 2 Drawing Figures

APPARATUS FOR REMOVING LEAKAGE FLOW OF A PRESSURIZED MEDIUM FROM GAP TYPE SEALS

BACKGROUND OF THE INVENTION

This invention relates to an apparatus for removing the leakage flow of a pressurized medium from gap type seals with a suction device coupled to the sealing location of the gap seal.

In connection with prior art gap seals it has been customary to remove the leakage flow occurring at the end of the sealing location. That is, the operating or lubricating medium such as oil or a cooling fluid passing through the sealing location, is drawn off by means of displacement pumps such as membrane or piston pumps or impeller pumps. Such pumping devices require their own drive means including their own motors, supply conduits, controls, locking means and so forth.

It is further known to press a medium such as air under a small excess pressure from outside the seal into the sealing gap thereby to prevent the escape of the operating medium or lubricating medium. However, this method is suitable only in connection with encapsulated bearings or sealing locations.

OBJECTS OF THE INVENTION

In view of the above it is the aim of the invention to achieve the following objects singly or in combination:

to provide a substantially simplified apparatus for removing the leakage flow of a medium in connection with gap type seals, which apparatus does not require its own separate driving mechanism and which operates with a minimum energy requirement;

to assure the operational reliability of the apparatus without providing special control, monitoring or locking devices; and to simplify the leakage control in gap type seals and to reduce the costs for such control.

SUMMARY OF THE INVENTION

According to the invention the above objectives are achieved by an apparatus for removing the leakage flow of a pressurized medium from a gap type seal, comprising suction means operatively connected to said gap type seal, said suction means comprising jet pump means including a working medium connecting inlet and a suction connecting inlet, and means coupling said suction connecting inlet of said jet pump means to said gap type seal and wherein said jet pump means is driven by a flowing medium supplied to said working medium connecting inlet.

According to the invention no separate drive and control means are necessary for removing the leakage flow, for example, of the oil passing through the sealing location. The pressurized medium which is present at the sealing location is utilized for driving a jet pump comprising the suction device. For driving the jet pump it is also possible to utilize the flowing medium in the return conduits of the hydraulic system in association with which the gap seals are used, and the energy present in such fluid medium, so that over all a coordinated and efficient utilization of the available energies is achieved. The apparatus according to the invention has a high operating reliability since it may cooperate automatically with the sealing location of a gap seal so that special switching and control devices are not required. A simple arrangement is achieved in an economical manner since the separate drive means, the control means, and the switching devices, are eliminated.

BRIEF FIGURE DESCRIPTION

Figure 2:
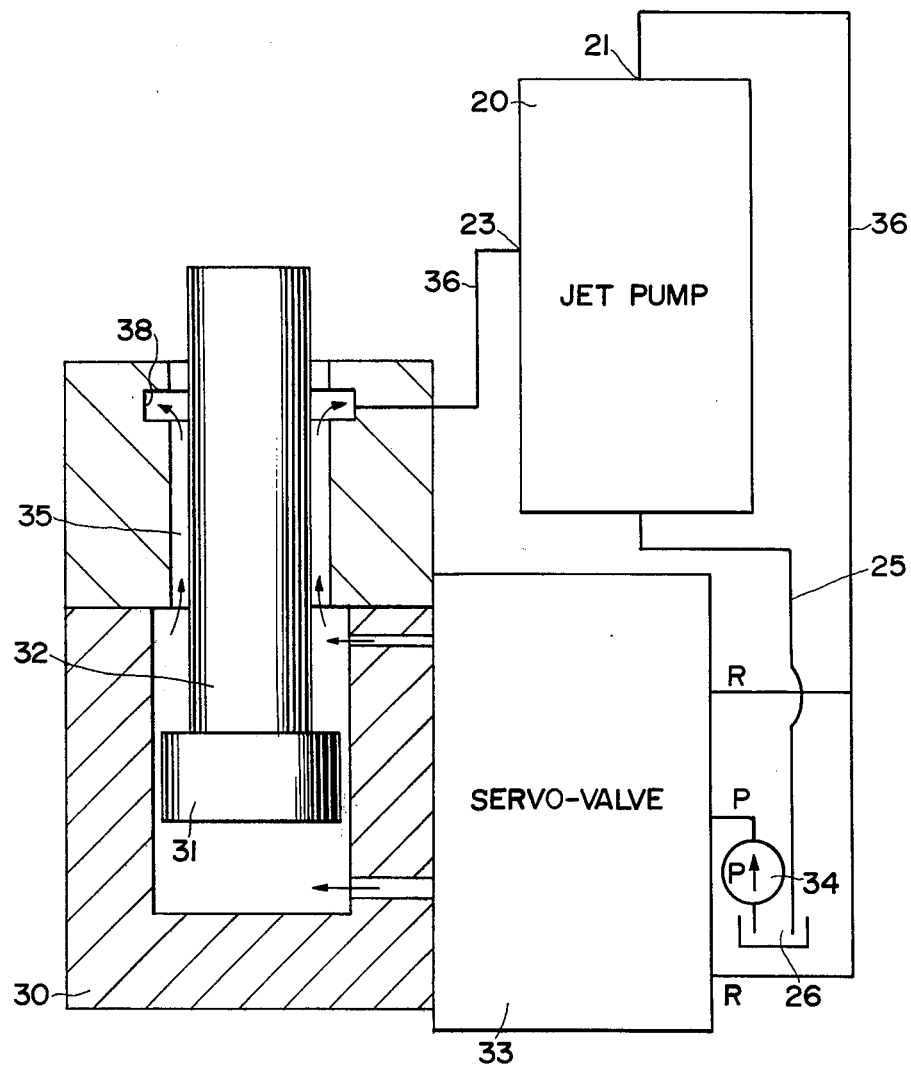

In order that the invention may be clearly understood, it will now be described, by way of example, with reference to the accompanying drawings, wherein:

FIG. 1 illustrates a sectional view through a hydro-static bearing with its gap sealing means to which there is connected, according to the invention, a jet pump; and FIG. 2 illustrates, also partially in section, the gap seal of a piston rod of a hydraulic load cylinder provided with a jet pump suction device which is driven through the return flow conduit of a hydraulic servo-valve.

DETAILED DESCRIPTION OF PREFERRED EXAMPLE EMBODIMENTS AND OF THE BEST MODE OF THE INVENTION

In the sectional view of FIG. 1 a shaft is supported in the bearing body 2 of a hydro-static bearing. The shaft 1 is capable of performing rotational as well as axial movements as indicated by the arrows A and B. The hydro-static bearing comprises bearing pockets 3 which are arranged in a known manner on the circumference of the bearing bore in the bearing body 2. These bearing pockets 3 communicate with one another through conduits or channels not shown. Bearing gaps are arranged in a known manner between the bearing pockets. The bearing pockets 3 are supplied with a fluid medium under pressure. For example, oil pressurized by means of a pressure generator 4, such as an oil pump is supplied through conduits 4' and through throttling elements, if desired.

The pressurized fluid is pressed out of the bearing pockets into the bearing gaps and causes the bearing and sliding of the supported element such as a shaft 1 in a known manner.

The leakage oil exiting from the hydro-static bearing first flows into the gap seals 5, 5' provided on both sides of the bearing. So-called pre-grooves or inner grooves 6, 6' and further sealing gaps 7, 7' pass the sealing oil into the suction grooves 8, 8'.

The sealing gaps 5, 5' provide a substantial resistance to the throughflow of the pressurized medium. Thus, a pressure differential is provided between the pressure in the bearing pockets 3 and in the bearing gaps, and the pressure in the pre-grooves or advance grooves 6, 6'. Thus, the throughflow quantity of the leakage oil is correspondingly limited.

The sealing gaps 7, 7' also assure in the same manner, that a higher pressure exists in the pre-grooves 6, 6' than in the suction grooves 8, 8'. In the latter, substantially atmospheric or environmental pressure is present. The pre-grooves or inner grooves 6, 6' and the suction grooves 8, 8' on both sides of the hydro-static bearing may be connected with each other through suitable conduits or channels 10, 11. The sealing gaps 5, 5', 7, 7', and 9, 9' from the bearing pockets 3 to the atmosphere or environment are collectively referred to herein as the "sealing location" of the gap. A pressure gradient or differential exists along the sealing location from the higher pressure of the medium at 3 to the lower ambient pressure at the outer end of the gap seal.

A jet pump 20 is mounted to the bearing body 2 according to the invention. The jet pump may, however, also be located remote from the bearing body to which it would be connected through suitable conduits. The basic assembly and the manner of operation of jet pumps are well known in the art. The jet pump 20 is thus only shown in a schematic manner in the drawing. The jet pump 20 comprises a work medium connecting inlet 21, a nozzle 22, a suction connecting inlet 23, a diffuser 24, and a discharge conduit 25.

The work medium connecting inlet 21 of the jet pump 20 is connected with the pre-grooves 5, 5' for driving the jet pump with the pressurized working medium at the intermediate pressure and flow energy prevailing in pre-grooves or inner grooves 6, 6'.

Instead of providing so-called pre-grooves or intermediate grooves it is possible to provide another suitable connecting location at the seal or at the bearing for the connection of the pressurized working medium to the jet pump. The jet pump is so dimensioned, that the pressure present in the pre-groove or inner groove 6, 6' or at any other selected connecting location and the respectively present throughflow quantity or flow energy is sufficient to drive the jet pump. The fluid medium pressure in the pre-grooves is converted in the nozzle 22 into fluid medium velocity whereby the pressure at the suction connecting inlet 23 falls below atmospheric pressure or below the environmental pressure.

When the suction or low pressure connecting inlet 23 of the suction jet pump 20 is connected with the suction grooves 8, 8', the pump will draw the quantity of oil flowing into the suction grooves due to the established reduced pressure and convey this oil quantity through the diffuser 24 and the discharge conduits 25 into an oil container 26. This oil quantity may be returned from the container 26 through the pump 4 back into the bearing circulatory system.

Thus, the suction grooves 8, 8' define a suction zone of the sealing location at substantially atmospheric or ambient pressure while the inner grooves 6, 6' define an inner zone of the sealing location at a pressure differential relative to atmospheric or ambient pressure, sufficient to drive the jet pump 20 and draw off the medium in the suction zone thereby eliminating leakage flow from the sealing location. As shown, several suction grooves 8, 8' may be connected to a single jet pump 20.

The suction pressure of the jet pump 20 is so dimensioned that it is sufficient for a given arrangement to prevent the exit of leakage oil from the sealing gaps 9, 9' into the atmosphere or the environment. If desired, small quantities of the environmental medium may also be sucked off as indicated by the arrows through the sealing gaps 9, 9'. Thus, a fault free or leak free sealing of the bearing location in the outward direction is assured, for example, even if the shaft 1 performs an oscillating axial movement.

FIG. 2 illustrates a hydraulic load cylinder 30 with a piston 31 including a piston rod 32. The load cylinder is supplied with oil under pressure through a servo-valve 33 of known construction and through an oil pump 34. The load cylinder 30 or more specifically the piston rod 32 is sealed outwardly through a gap seal 35. The hydraulic oil passing through the sealing gap of the gap seal is accumulated in the suction groove 38.

The suction groove 38 is connected through a conduit 36 to the suction connecting inlet 23 of the jet pump 20. The working medium connecting inlet 21 of the jet pump 20 is connected with the return flow conduit 36 coming from the servo-valve 33 at the location R. The pressure medium normally returning from the servo-valve into the oil tank, still has sufficient pressure or rather flow energy for driving the jet pump 20. The working medium coming from the servo-valve 33 and required for driving the jet pump 20 is returned together with the pressure medium drawn from suction groove 38 into the oil pump 26 through the return conduit 25. The operation of the arrangement of FIG. 2 is basically the same as the operation of the arrangement of FIG. 1. Thus, the illustrated arrangement makes it possible to keep the gap seal 35 free of leaks in a simple manner.

The jet pump 20 may be driven through a special or separate source of pressure of pressurized fluid medium not shown but externally provided if this should be deemed suitable or necessary. If the jet pump is suitably dimensioned, several sealing locations or bearings may be connected to one pump. The jet pump may further be utilized for removing gaseous media whereby it would be correspondingly driven by gaseous media. As used herein and in the following claims, the phrase "fluid medium" is therefore intended to include both liquid and gaseous media.

Further, it is possible to drive the jet pump simultaneously through several drive sources. For this purpose the working medium connecting inlet 21 of the jet pump 20 may be connected for example with the pre-groove 6, 6' as well as with the return flow conduit 36 of a servo-valve 33, or it may be connected to an external pressure source.

Although the invention has been described with reference to specific example embodiments, it will be appreciated, that it is intended, to cover all modifications and equivalents within the scope of the appended claims.

What is claimed is:

1. An apparatus for removing the leakage flow of a pressurized medium from a gap type seal, comprising suction means operatively connected to said gap type seal, said suction means comprising jet pump means including a working medium connecting inlet and a suction connecting inlet, and means coupling said suction connecting inlet of said jet pump means to said gap type seal and wherein said jet pump means is driven by a flowing medium supplied to said working medium connecting inlet.

2. The apparatus of claim 1, wherein said gap type seal comprises a sealing location and suction groove means at said sealing location, said suction connecting inlet being coupled to said suction groove for drawing off leakage flow of the pressurized medium in the gap seal.

3. The apparatus of claim 1, wherein said gap type seal comprises a sealing location including an inner zone having a pressure sufficient for driving said jet pump means by the pressurized medium in the gap type seal, said working medium connecting inlet of the jet pump means being coupled with said inner zone of said sealing location.

4. The apparatus of claim 3, wherein said gap type seal comprises an inner groove in said inner zone of said sealing location, said working medium connecting inlet of the jet pump means being connected with said inner groove.

5. The apparatus of claim 1, further comprising servo-hydraulic control means including return flow conduit means, said working medium connecting inlet of said jet pump means being connected to said return flow conduit means.

6. The apparatus of claim 1, wherein said gap type seal comprises several sealing locations connected to said jet pump means.

7. The apparatus of claim 1, wherein said jet pump means produce a suction pressure which is slightly lower than atmospheric pressure or ambient pressure.

8. The apparatus of claim 1, further comprising at least two different flowing medium drive sources, said working medium connecting inlet being connected to said two different flowing medium drive sources.

9. The apparatus of claim 1, wherein the working medium connecting inlet is coupled to an externally supplied flowing medium.

10. The apparatus of claim 1, wherein said suction connecting inlet of the jet pump means is coupled to a suction zone of the sealing location at substantially atmospheric or ambient pressure while the working medium connecting inlet of the jet pump means is coupled to an inner zone of the sealing location at a pressure differential relative to atmospheric or ambient pressure sufficient to drive the jet pump means and to draw off the medium in the suction zone thereby eliminating leakage flow from the sealing location.

11. The apparatus of claim 10, wherein the suction zone is formed with a suction groove and the inner zone is formed with an inner groove.

* * * * *